United States Patent [19]
Kleyn

[11] Patent Number: 5,468,923
[45] Date of Patent: Nov. 21, 1995

[54] MOLDED MUFFLER

[75] Inventor: Hendrik Kleyn, Grandville, Mich.

[73] Assignee: Kleyn Die Engravers, Inc., Jenison, Mich.

[21] Appl. No.: 192,594

[22] Filed: Feb. 7, 1994

[51] Int. Cl.⁶ ..................................................... F01N 7/18
[52] U.S. Cl. .................. 181/282; 181/258; 181/268; 181/272; 181/246; 60/299
[58] Field of Search ...................... 181/231, 232, 181/240, 235, 246, 257, 258, 264, 268, 270, 272, 275, 282; 60/299, 302

[56] References Cited

U.S. PATENT DOCUMENTS

| 2,859,830 | 11/1958 | Hoffar. |
| 2,933,148 | 4/1960 | Hendry. |
| 3,095,944 | 7/1963 | Buxton. |
| 3,187,837 | 6/1965 | Beeching. |
| 3,638,756 | 2/1972 | Thiele. |
| 3,798,769 | 3/1974 | Bailey .................. 181/230 |
| 4,589,516 | 5/1986 | Inoue et al.. |
| 4,759,423 | 7/1988 | Harwood et al.. |
| 4,836,330 | 6/1989 | Harwood et al.. |
| 4,866,932 | 9/1989 | Morita et al. .................. 60/299 X |
| 4,901,815 | 2/1990 | Harwood et al.. |
| 4,924,968 | 5/1990 | Moring, III et al.. |
| 4,958,701 | 9/1990 | Moring, III. |
| 5,004,069 | 4/1991 | Van Blaircum et al.. |
| 5,012,891 | 5/1991 | Macaluso. |
| 5,052,513 | 10/1991 | Yoshikawa et al.. |
| 5,355,973 | 10/1994 | Wagner et al. .................. 181/258 |
| 5,399,629 | 8/1994 | Winberg et al. .................. 60/299 |

Primary Examiner—Khanh Dang
Attorney, Agent, or Firm—Warner Norcross & Judd

[57] ABSTRACT

A polymeric muffler including two halves each with baffle walls and gas flow openings integrally molded therein. The gas flow openings do not intersect with the mating edges of the baffle walls. The muffler halves are joined along the mating edges of the baffle walls and the outer walls of the two muffler halves. In a preferred embodiment, the muffler includes a filter detachably mounted on the muffler for converting exhaust gases into less toxic products. The gas flow openings are positioned to force all exhaust gas to pass through the filter.

15 Claims, 9 Drawing Sheets

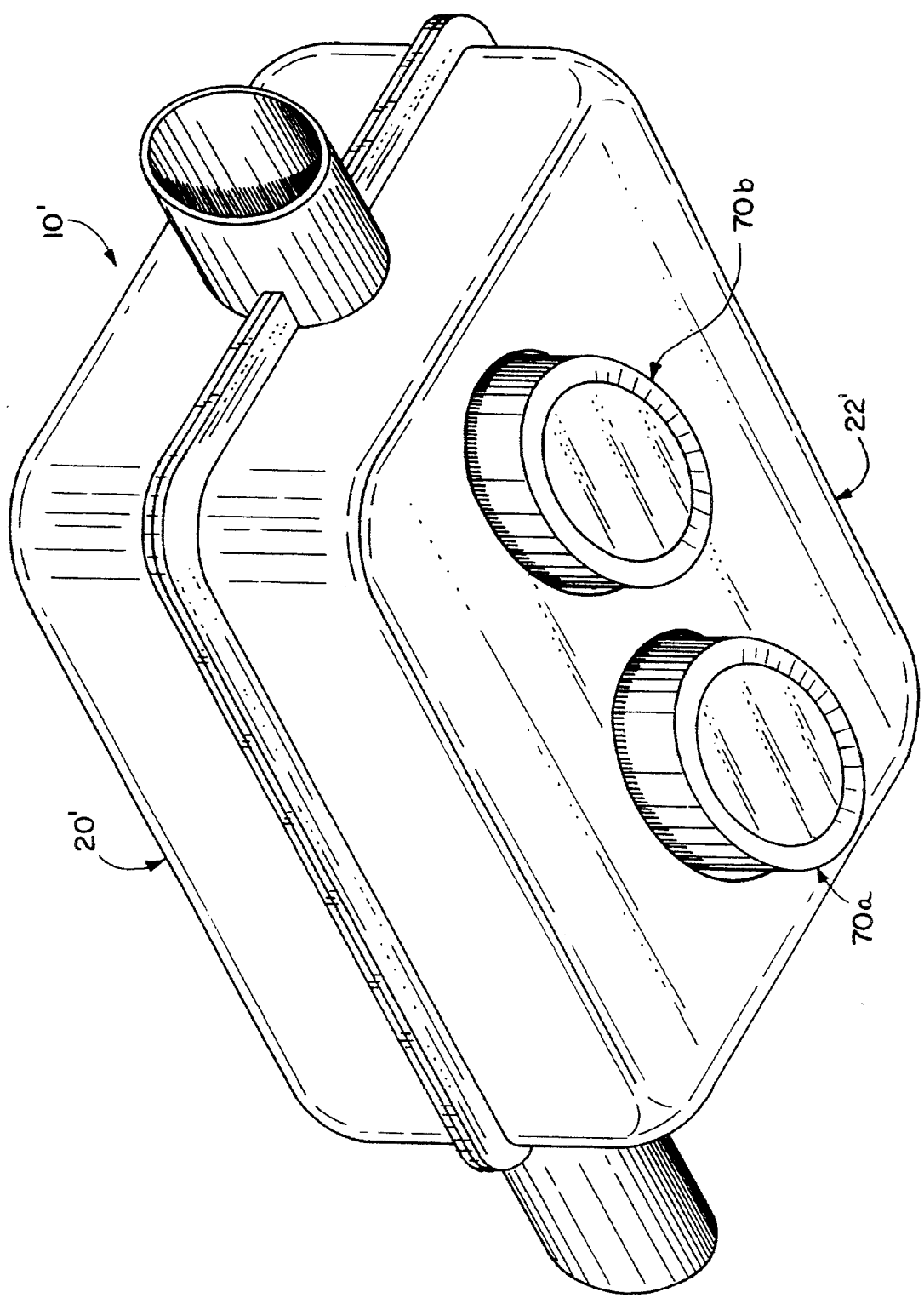

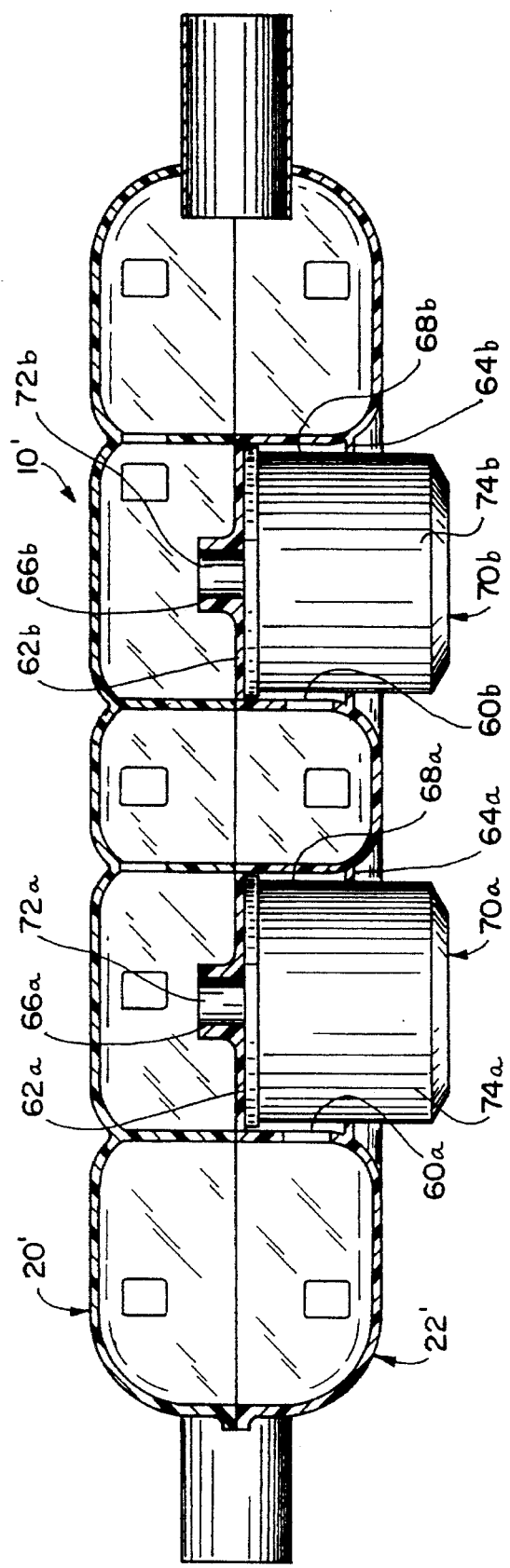
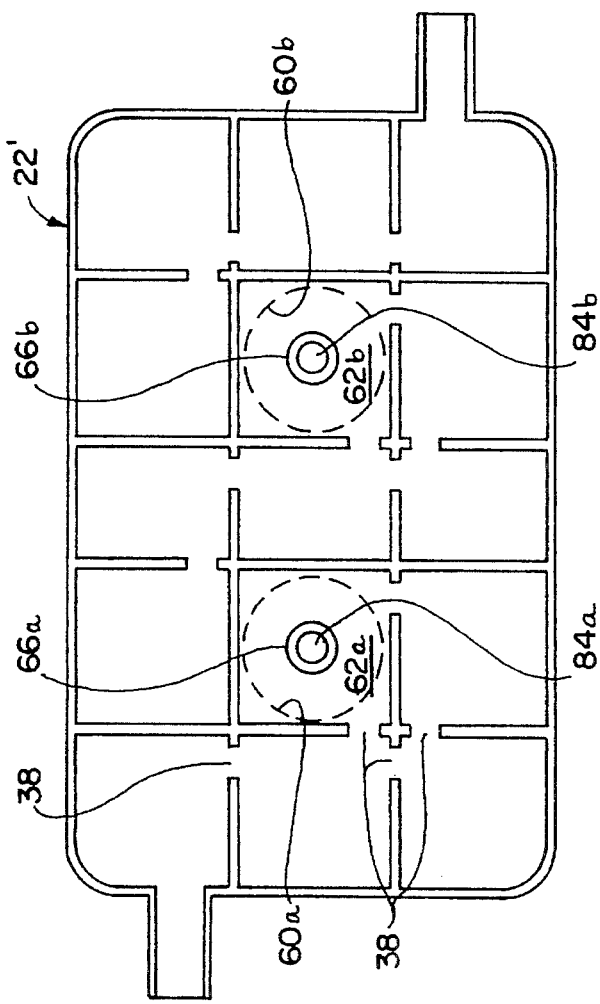

MOLDED MUFFLER

BACKGROUND OF THE INVENTION

The present invention relates to an improved molded muffler formed of a polymeric material.

A variety of mufflers have been designed to reduce the noise output related to the exhaust from internal combustion engines. Traditionally, mufflers are formed of a metal shell which encases a variety of baffles walls or interconnected chambers. These metal mufflers are highly susceptible to corrosion largely the result of acids which condense within the muffler.

There have been a variety of attempts to overcome the corrosion problems of a metal muffler. One such attempt is disclosed in U.S. Pat. No. 3,638,756 issued Feb. 1, 1972 to Thiele. Thiele discloses a stamped metal muffler constructed by bonding top and bottom muffler halves along only their outside edge by welding, adhesive or brazing. The top and bottom pieces are stamped to create a series of mixing chambers within the muffler. Thiele suggests that the two muffler halves may be molded of plastic (column 1, lines 59–62), but does not suggest how this might be accomplished. Thiele contends that corrosion is largely the result of bare metal edges exposed to corrosive elements within the interior of the muffler. Thiele further asserts that stamped construction will largely overcome this problem as it eliminates bare metal edges within the muffler's interior. The disclosed Thiele muffler is metal and therefore subject to corrosion.

A more successful way to address the problem of corrosion is to provide a muffler formed of plastic. A vibratory flexible silencer formed by bonding two halves fashioned of an elastomer or plastic material is disclosed in U.S. Pat. No. 2,859,830 issued Nov. 11, 1958 to Hoffar. A number of damper walls are positioned within the silencer body. The damper walls are designed to be slightly shorter than the exterior wall of the silencer. This creates a narrow slit through which the exhaust gas may flow when the two halves are joined. These gas flow slits lie along the plane of contact between the two muffler halves. The muffler halves are joined about their perimeters only. Further, all of the gas flow openings intersect a single plane, thereby weakening the overall structure of the muffler.

It is also desirable to reduce the pollution caused by automobile exhaust by converting otherwise harmful exhaust into primarily harmless products. Typically, this is done by means of a catalytic converter located in the exhaust assembly upstream and separate from the muffler. The typical catalytic converter is housed in a metal shell susceptible to corrosion as discussed above. Further, maintenance and replacement of a catalytic converter is relatively expensive and labor intensive.

SUMMARY OF THE INVENTION

The aforementioned problems are overcome in the present invention wherein a polymeric muffler includes two halves each including an external wall and integral internal baffles. The external walls and internal baffles of each half are bonded to their counterparts in the other half. Passageways are provided through the internal walls at a location other than the intersection of the two muffler halves.

The structural integrity of the muffler is improved by the bonding of all mating edges-both the external walls and the internal baffles. The position of the passageways out of alignment with the mating halves contributes to the increased bonding area.

In a second aspect of the invention, the muffler includes a filter for converting exhaust gases into primarily harmless products. The muffler includes at least one filter chamber adapted to receive at least one filter. The passageways within the muffler are defined so that the exhaust gases are directed through the filter. Preferably, the filters include a bayonet-type mount for easy insertion and servicing.

These and other objects, advantages, and features of the present invention will be more fully understood and appreciated by reference to the detailed description of the preferred embodiment and the drawings.

BRIEF DESCRIPTION OF THE DRAWINGS

FIG. 5 is a bottom perspective view of an alternative embodiment of the present invention;

FIG. 6 is a sectional view taken along line VI—VI of FIG. 5;

FIG. 9 is a top plan view of a muffler half having filter chambers;

DETAILED DESCRIPTION OF THE PREFERRED EMBODIMENT

I. Muffler

A. Basic Polymeric Construction

Figure 1:
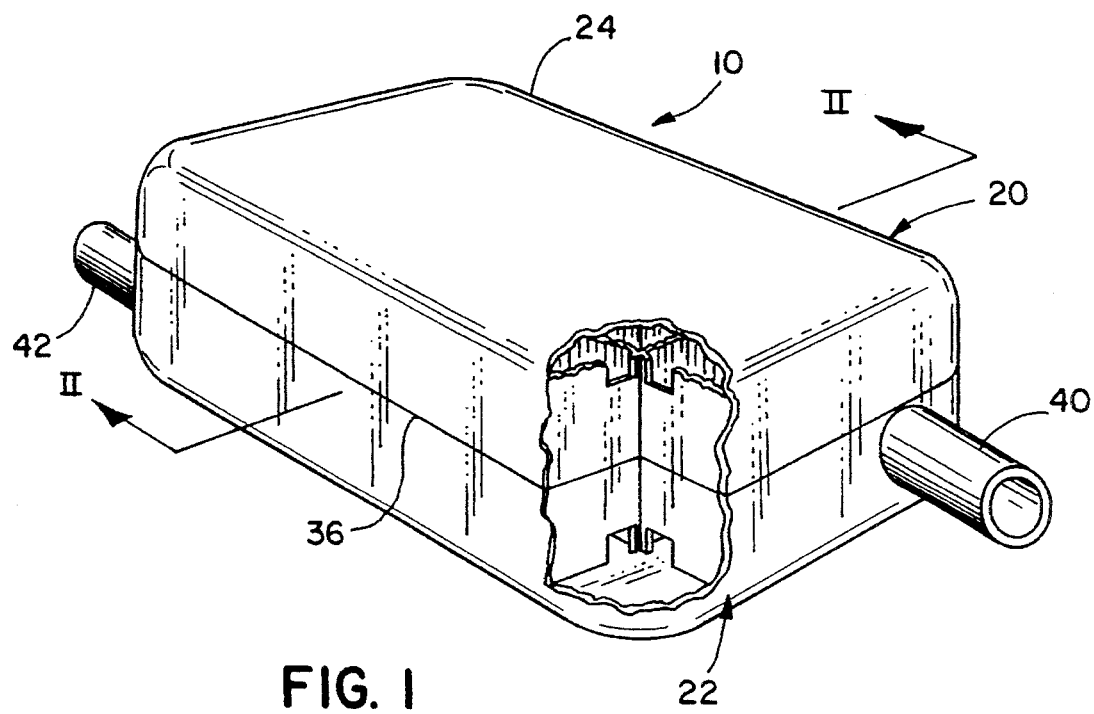
FIG. 1 is a perspective view, with parts cut away, of the muffler of the present invention.
Figure 2:
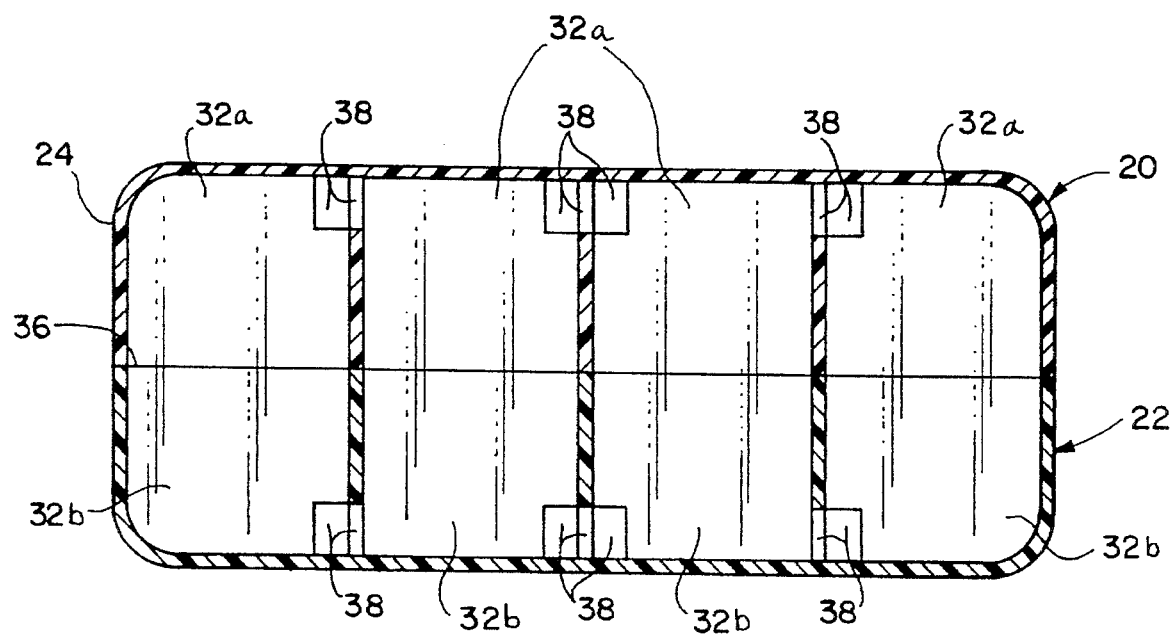
FIG. 2 is a sectional view, taken along line II—II, of FIG. 1.

By way of disclosing a preferred embodiment, and not by way of limitation, there is shown in FIG. 1 a polymeric muffler 10 which includes two muffler halves 20 and 22 each having internal honeycomb baffle walls 32a, 32b, 34a and 34b and gas flow openings 38 molded integrally therein (See FIG. 2).

Each muffler half 20 and 22 is injection molded and includes a cup shaped outer wall 24, which generally includes a bottom wall 26 and four side walls 28a–d extending upward from the bottom wall.

Figure 4:
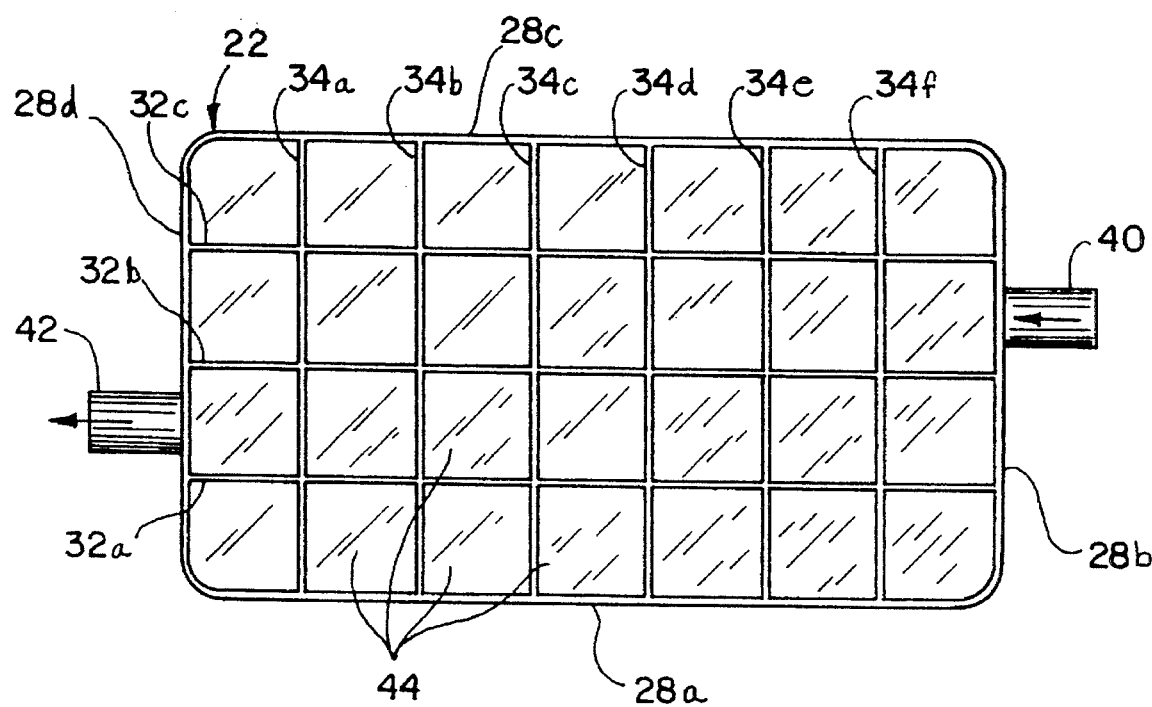
FIG. 4 is a top view of a muffler half.

The interior of the muffler 10 is divided into a plurality of chambers 44 by intersecting internal honeycomb baffle walls 32a, 32b, 34a and 34b that extend longitudinally (32a, 32b) and laterally (34a, 34b) within each muffler half 20 and 22 (see FIGS. 2 and 4). The baffle walls 32a, 32b, 34a and 34b are formed integrally with each muffler half 20 and 22. The top edges of the baffle walls 32a, 32b, 34a and 34b lie along a plane defined by the top edge 36 of the outer wall 24. The baffle walls 32a, 32b, 34a and 34b of each muffler half 20 and 22 are aligned with the baffle walls of the opposite half to form a continuous wall from top to bottom of the muffler 10.

The plurality of chambers 44 are in communication with one another through a plurality of gas flow openings 38 disposed in the baffle walls 32a, 32b, 34a and 34b. The openings provide passageways to permit gas to flow between the chambers. Each of the gas flow openings 38 are positioned to allow exhaust gas to flow into, through and out of the muffler, and are of sufficient size to preclude excessive back-pressure.

As illustrated in FIGS. 1 and 4, hollow cylindrical input and output pipes 40 and 42 extend from opposite ends of the muffler 10. Both pipes 40 and 42 provide passageways through the outer wall of the muffler 10 and provide internal/external communication. The chambers within the muffler 10 are in communication with the input and output ports 40 and 42, wherein exhaust gas enters the muffler 10 through input port 40, flows through the internal chambers via the gas flow openings 38, and exits the muffler 10 through output port 42.

The two muffler halves 20 and 22 are welded together along the mating edges of the baffle walls 32a, 32b, 34a and 34b, and along the mating edges of the outer walls.

A preferred method for joining the two muffler halves 20 and 22 is hot-plate welding. Other suitable bonding techniques may be substituted for hot-plate welding.

The presently preferred material for the muffler 10 is 1140L4.40% sold by Hoechst Celanese. Other suitable materials will be recognized by those having skill in the art.

B. Filter Option

In an alternative embodiment illustrated in FIGS. 5–9, the muffler 10' includes at least one filter 70 which functions to convert the exhaust gases into primarily harmless products. As shown in FIGS. 5, 6 and 9, the muffler halves 20' and 22' are formed primarily as set forth above. However, one of the muffler halves 22' includes at least one filter chamber 60a–b for receiving a filter 70. The present embodiment includes two cylindrical filter chambers 60a–b each receiving a filter 70a–b (See FIGS. 5 and 6). The number, size, and location of filters 70 and filter chambers 60 will vary to meet particular applications and performance criteria. As perhaps best illustrated in FIG. 6, the cylindrical chambers 60a–b each include a top wall 62a–b defining an opening 66a–b and an annular seal 64a–b which fits tightly against the filters 70a–b to provide a gas-tight seal.

Figure 7:
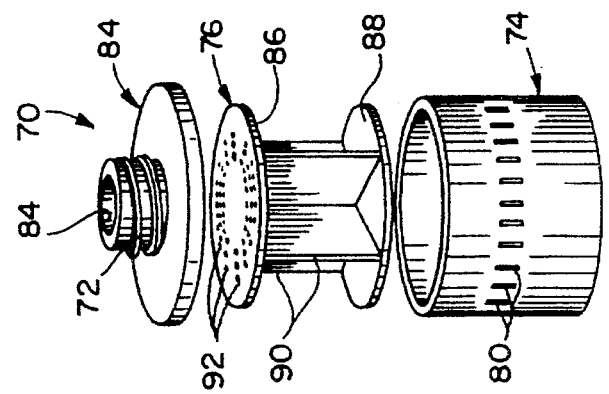
FIG. 7 is an exploded perspective view of a filter.
Figure 8:
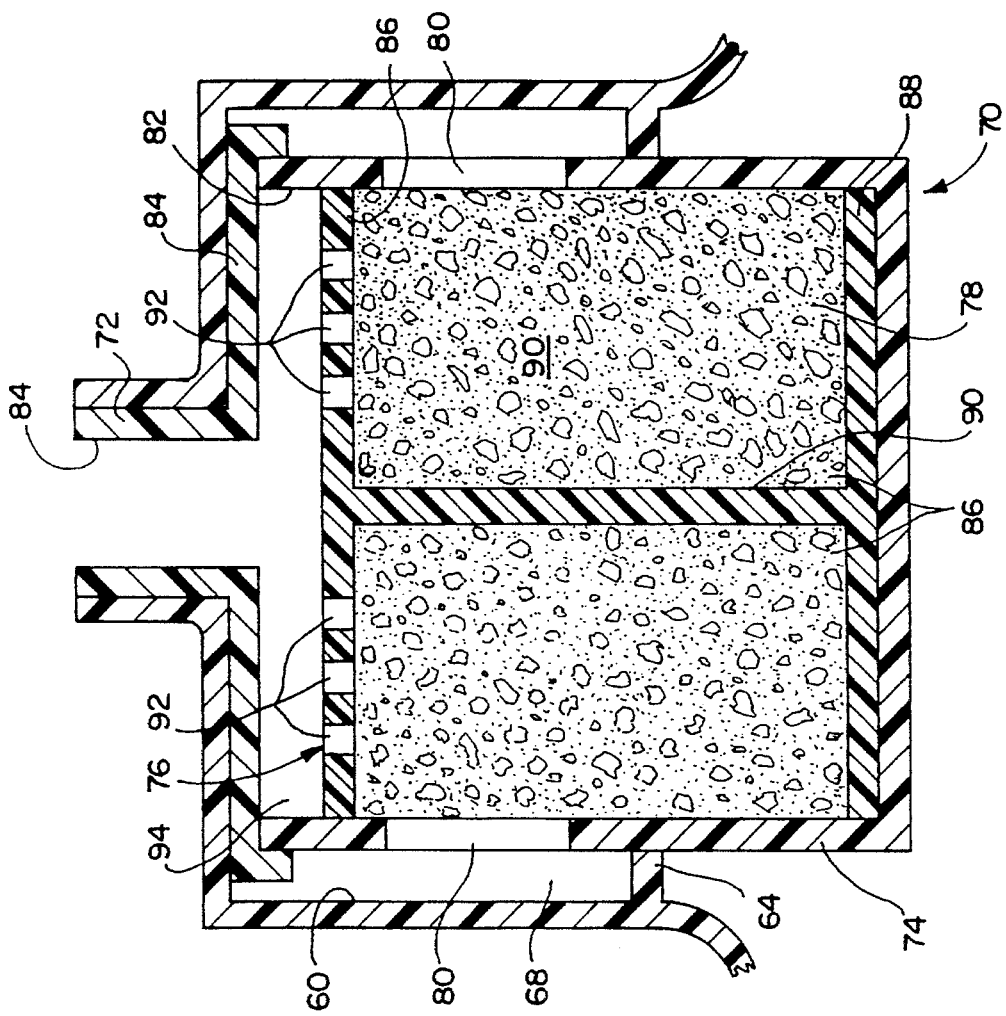
FIG. 8 is a fragmentary sectional view of a filter mounted within a filter chamber.

As depicted in FIGS. 7 and 8, the filter 70 includes a polymeric shell or canister 74 defining an internal cylindrical chamber 82. The canister 74 includes a cylindrical side wall 75 and an integral floor 77, thereby forming a cup-shaped receptacle. The filter 70 further includes a polymeric top wall 84 integrally formed with a filter stem 72. The filter stem 72 defines an axial opening 84 which provides internal/external communication for the filter 70. As noted above, the filter stem 72a–b is received within openings 66a–b to secure the filter 70a–b within the filter chamber 60a–b. The cylindrical wall 75 of the filter shell 74 further includes a plurality of longitudinal slits or perforations 80 to permit gas flow through the shell. When the filter 70a–b is properly installed within a filter chamber 60a–b, perforations 80a–b are entirely enclosed within gas flow chambers 68a–b and above seals 64a–b.

A polymeric insert 76 containing a filter media 78 is seated within the cylindrical canister 74. The filter media is an absorbent of granules such as NOCHAR H620 car bond sold by Lenderink Tech of Belmont, Mich. or gypsum (hydrous calcium sulfate). Other filter/catalytic media can be selected depending on the particular components to be removed from the gaseous stream. "Filter media" as used herein means any material selected for its property of processing a gaseous stream. Such processing may be by absorption, adsorption, chemical reaction, catalytic conversion, or any other technique for altering the chemical make-up of the stream. The insert 76 includes a top wall 86, a bottom wall 88 and two intersecting support walls 90. The top and bottom walls 86 and 88 are generally circular and have an external diameter generally identical to the internal diameter of the cylindrical chamber 82. The support walls 90 extend between the top and bottom walls 86 and 88 and function to divide the cylindrical chamber 82 into four distinct compartments 86 of generally equal size. The insert 76 is axially shorter than the cylindrical chamber 82 to define an outflow chamber 94 within the cylindrical chamber 82 above the top wall 86. The top wall 86 defines a plurality of openings 92 which provide communication between compartments 86 and outflow chamber 94.

The gas flow openings 38 of the muffler 10 are positioned such that the exhaust gas is forced to pass through one or both filters 70a–b (See FIG. 9). This is achieved by positioning the gas flow openings 38 to direct the exhaust gas into one or both of the gas flow chambers 68a–b. As described above, a gas flow pathway is provided from gas flow chambers 68a–b into compartments 86 through perforations 80, out of compartments 86 and into outflow chamber 94 through openings 92, and then out of the outflow chamber 94 through the axial opening 84 in the filter stem 72. This gas flow pathway forces the exhaust gas to pass through the filter media 78 contained in each of compartments 86.

II. Molding of Muffler Halves

The gas flow openings 38 are formed in the baffle walls 32a, 32b, 34a and 34b simultaneously with the manufacture of the muffler halves 20 and 22 in an injection molding machine. One exemplary molding process will be disclosed.

Figure 10:
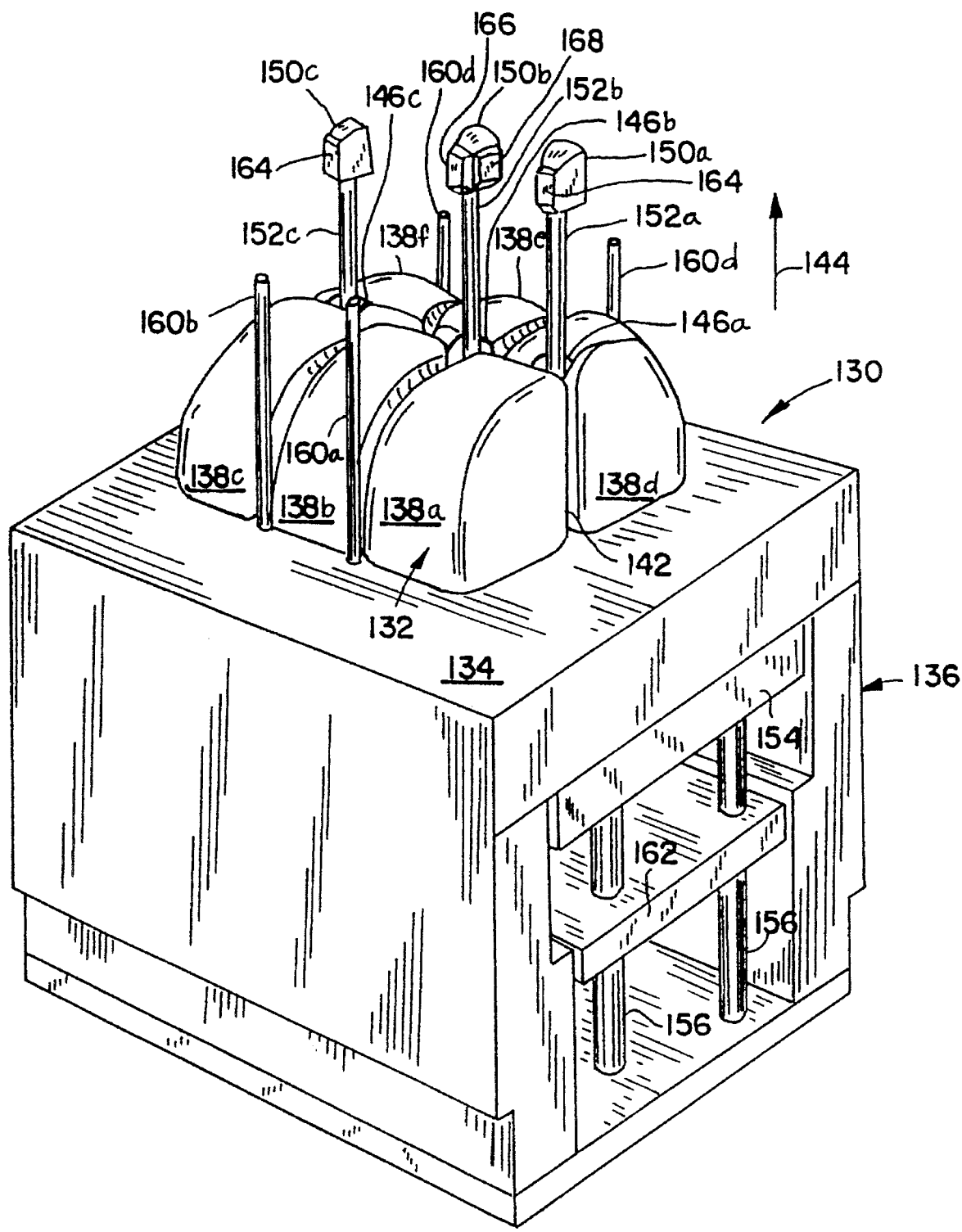
FIG. 10 is a perspective view of a male mold and mold base adapted for manufacturing the muffler halves.

There is shown in FIG. 10 a molding apparatus 130 having a male mold 132 affixed to the outwardly directed surface 134 of a mold base 136. The male mold includes several projections 138a–138f which form the cells defined by the baffle walls of a muffler half to be formed on the mold. Between adjacent pairs of the projections there are formed voids, such as void 142, in which the internal walls of the muffler half are formed.

It should be understood that the molding apparatus is shown in various configurations in FIGS. 10 and 13–16, and that these configurations do not necessarily conform to the shape of the muffler halves shown in FIGS. 1–4. These various configurations are included to disclose the structural and operational features of the molding apparatus as will be apparent from the following description. The molding apparatus may be configured to produce muffler halves having any number or arrangement of cells.

Figure 3:
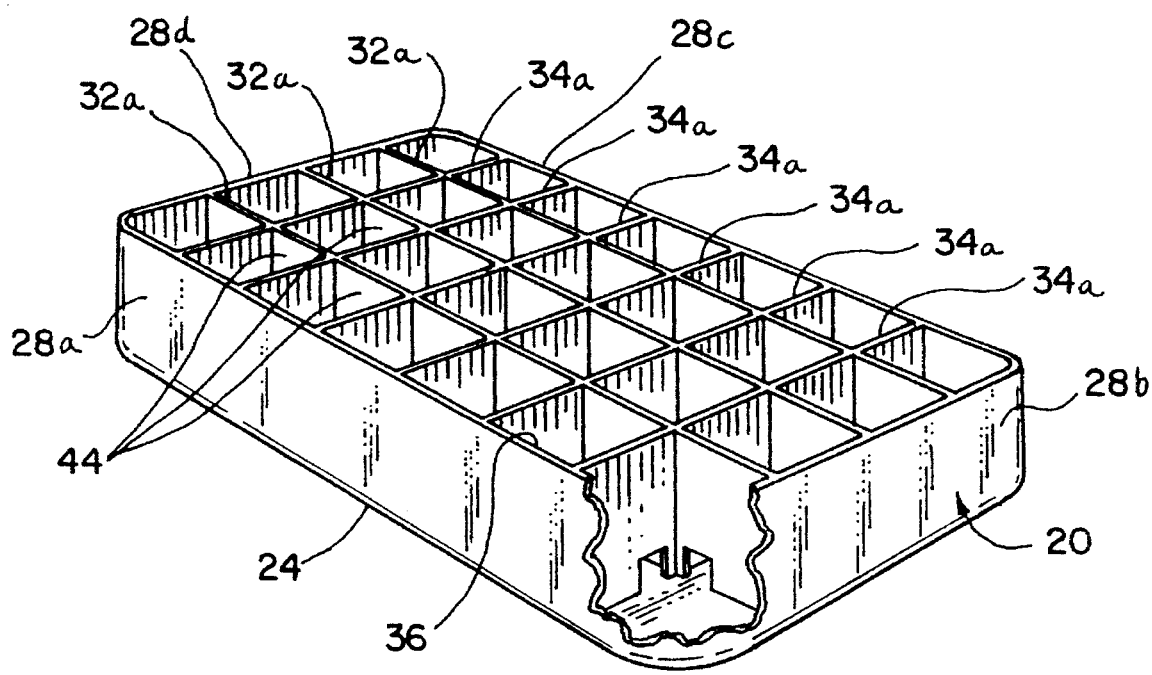
FIG. 3 is a perspective view, partially broken away, of a muffler half.

The projections 13a–138f extend outwardly from the mold generally in the same direction in which the muffler halves will be removed from the mold as indicated by arrow 144. The direction denoted by arrow 144 is referred to herein as "outward" and is intended to refer to the direction in which the muffler half moves substantially away from the male mold after molding is complete. In the embodiment of FIG. 3, this direction is substantially perpendicular to the mold face 134. Where the muffler half is to be formed with undercuts, the projections are formed with recesses, such as recesses 146a–146c in projections 138d–138f, respectively.

Lifter heads 150a–150c are shown in their fully extended position. When retracted, the lifter heads are received within the corresponding recesses 146a–146c. The lifter heads are affixed to the outer ends of lifter rods 152a–152c. The lifter rods extend through the recesses 146a–146 and through holes formed through the mold base 136. The inner ends of the lifter rods 152a–152c are affixed to a lifter plate 154 which is mounted on guide rods 156 for outward movement to extend the lifter heads, and for inward movement to retract the lifter heads into the recesses 146a–146c.

Ejector pins 160a–160d are shown in their partially extended position. When retracted, the outer ends of the ejector pins lie flush with the mold face 134. The ejector pins are positioned such that their outer ends contact a surface of the muffler half such as the outer wall 24 of the muffler half shown in FIG. 3. The ejector pins extend through holes formed through the mold base 136 and through holes formed through the lifter plate 154. The inner ends of the ejector pins are affixed to ejector plate 162 which is mounted on guide rods 156 for outward movement to extend the ejector pins, and for inward movement to retract the ejector pins.

Lifter heads 150a and 150c have single protrusions 164 which form a single undercut opening in an internal wall of the muffler half. Lifter head 150b has two protrusions 166, 168 which form the undercut openings in each of two intersecting internal walls of the muffler half adjacent the corner formed at the intersection.

Figure 11:
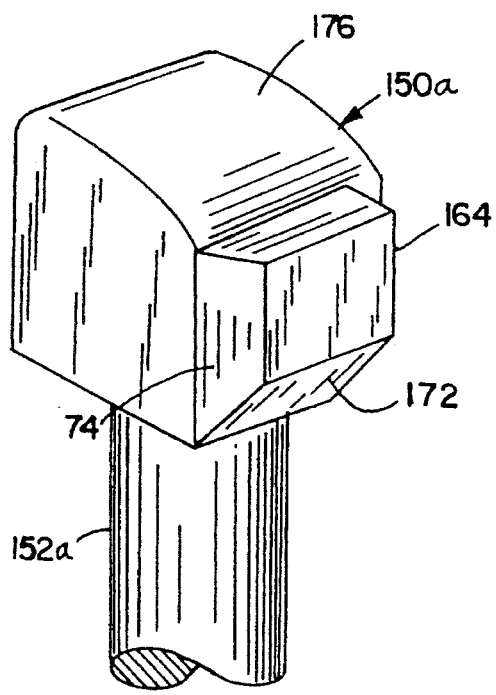
FIG. 11 is an enlarged, perspective, fragmentary view of a lifter head of the apparatus shown in FIG. 5 having a single protrusion.
Figure 16:
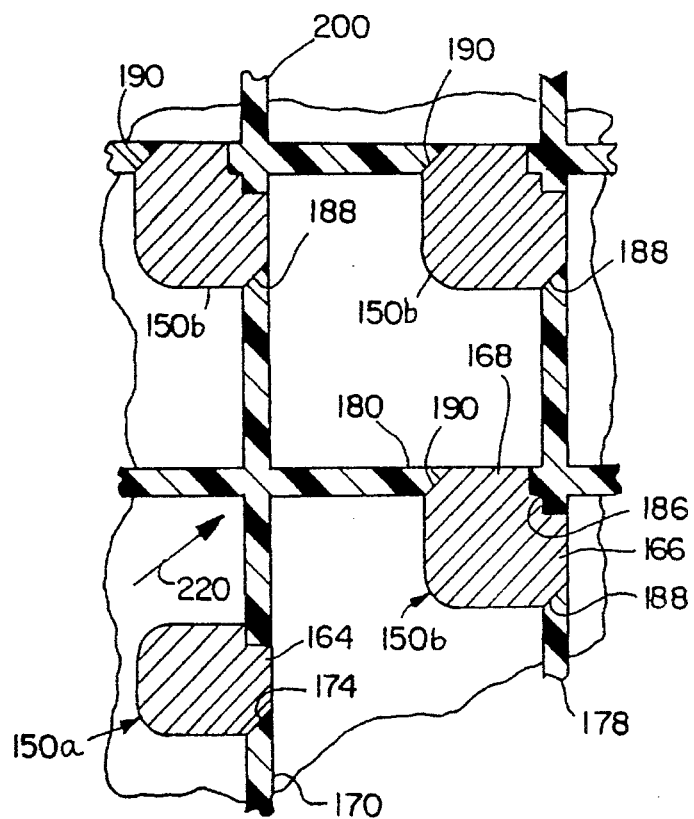
FIG. 16 is a fragmentary, plan, sectional view of a muffler half on the lifter heads of the molding apparatus.
Figure 15:
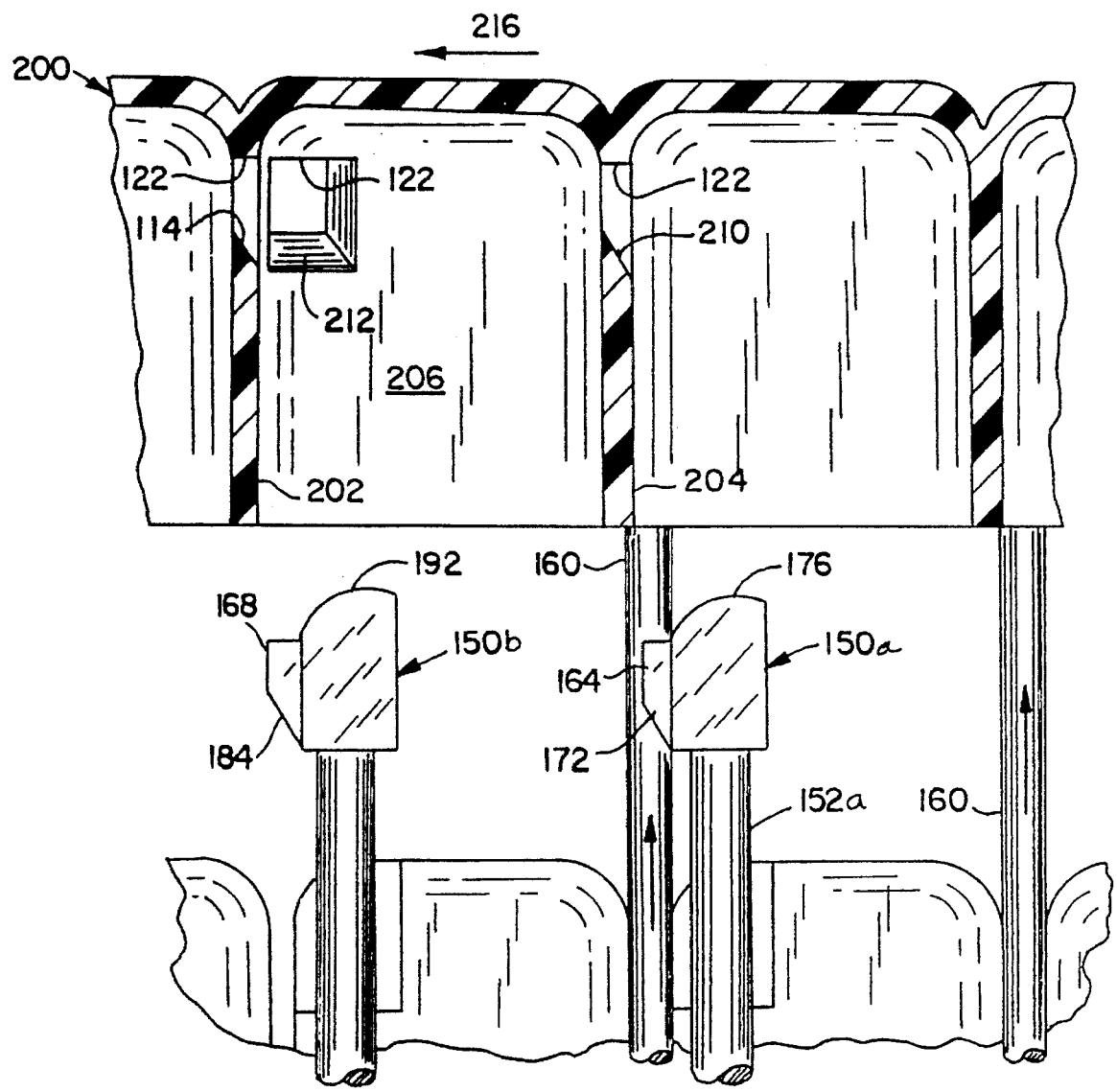
FIG. 15 is similar to FIG. 9 but showing the ejector pins fully extended.

The details of a single protrusion lifter head 150a are shown in FIGS. 11, 15 and 16. The lifter head is enlarged with respect to the lifter rod 152a to which it is affixed. The lifter head is generally four-sided, with protrusion 164 extending transversely into the void of the male mold in which wall 170 of the muffler half shown in FIG. 16 is formed. The inwardly directed edge of the protrusion is beveled so as to provide an inward ramping surface 172. Another edge of the protrusion extending generally parallel to the outward direction is beveled so as to provide a sloping release surface 174. The outer surface 176 of the lifter head is shaped to match the contours of the mold projection into which the lifter head is recessed when retracted.

Figure 12:
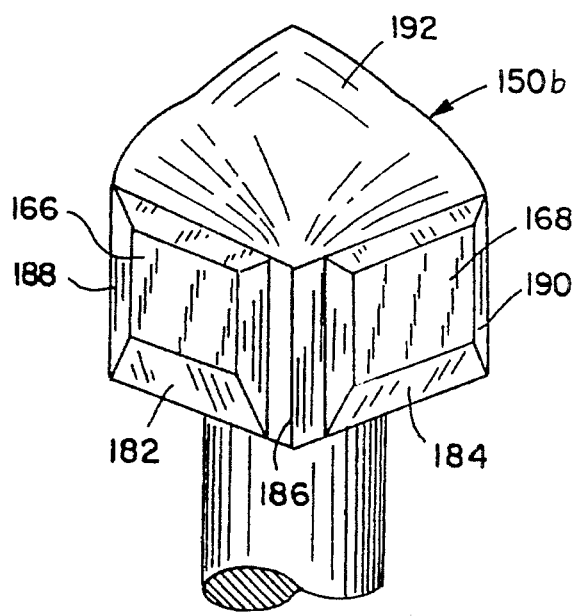
FIG. 12 is an enlarged, perspective, fragmentary view of a lifter head having two protrusions.

The details of a double protrusion lifter head 150b are shown in FIGS. 12, 15 and 16. This lifter head is also generally four sided, with protrusions 166, 168 extending transversely from adjacent sides into the voids of the male mold in which intersecting walls 178 and 180 are formed. The inwardly directed edge of each protrusions is beveled so as to provide inward ramping surfaces 182, 184. The edges of the protrusions 166, 168 opposite the corner 186 at which the walls 178 and 180 intersect, which edges extend generally parallel to the outward direction, are beveled so as to provide release surfaces 188, 190 which slope toward the corner 186. The outer surface 192 is shaped to match the contours of the mold projection into which the lifter head is recessed when retracted.

Figure 13:
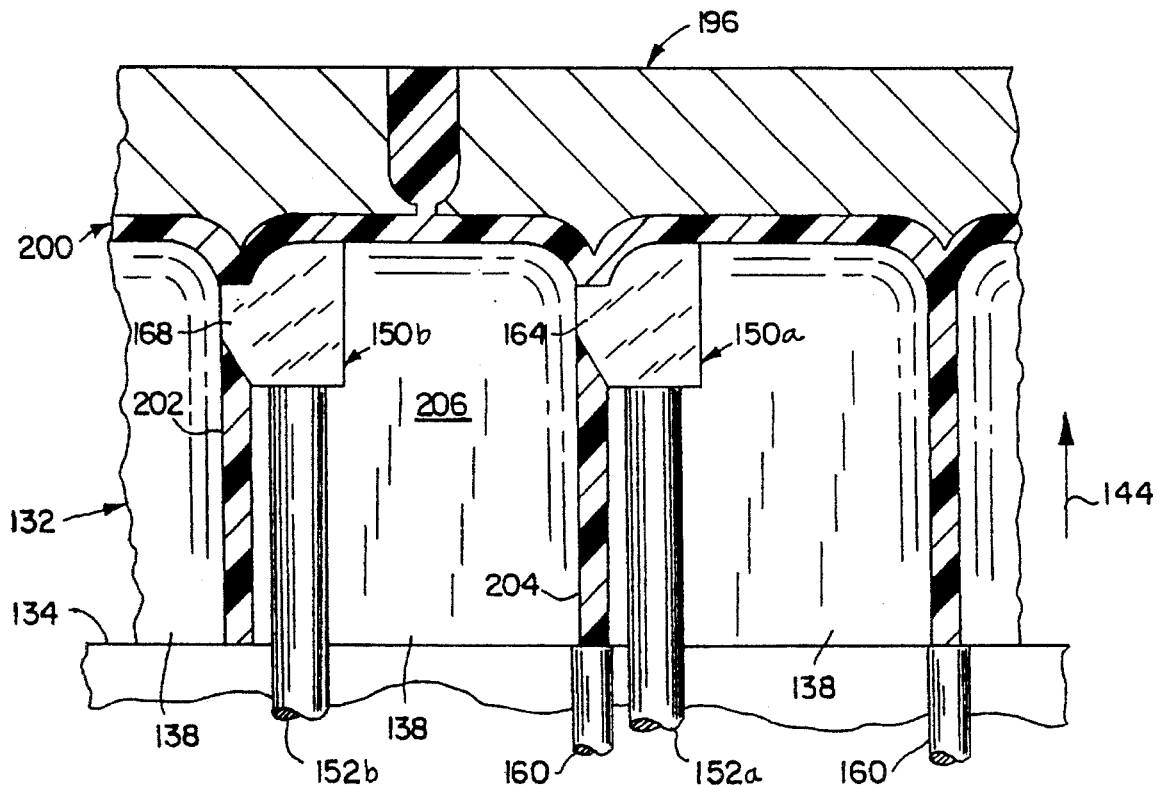
FIG. 13 is a fragmentary, elevational, sectional view of a molding apparatus similar to that shown in FIG. 5 taken along a line adjacent the lifter heads with the lifter heads and ejector pins retracted.
Figure 14:
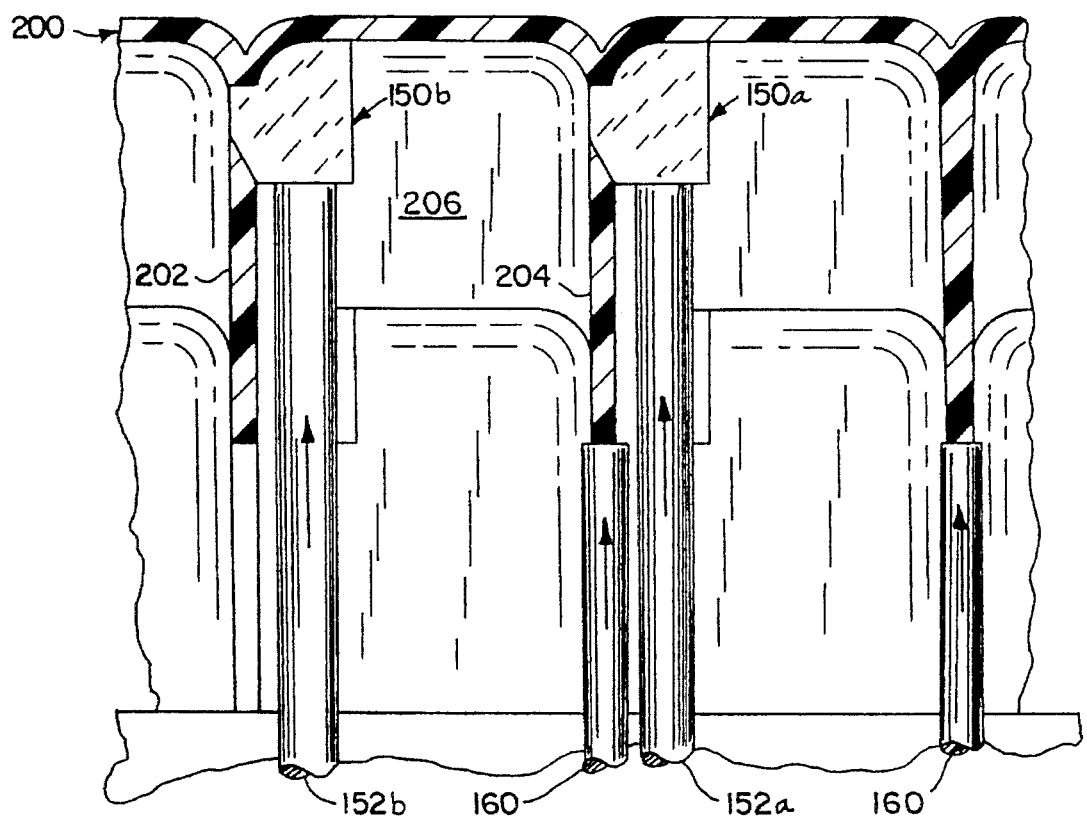
FIG. 14 is similar to FIG. 8 but showing the lifter heads fully extended and the ejector pins partially extended.

The operation of the mold is illustrated in FIGS. 13–15. As shown in FIG. 13, a molding cycle begins with the lifter heads and lifter rods, such as lifter heads 150a and 150b, retracted into the recesses of the projections 138 of the male mold 132. Ejector pins 160 are retracted so that their outer ends are flush with the mold base outer surface 134. Female mold 196 is closed in cooperation with the male mold so as to define the void in which the muffler half will be formed.

Molten plastic is then injected into the void to form the muffler half 200. The muffler half is formed with internal walls such as walls 202, 204, and 206 formed in the voids between the projections. The direction of muffler half removal 144 is determined by the orientation of the walls. Protrusion 164 of lifter head 150a extends transversely to the removal direction 144 into wall 104. Protrusion 168 of lifter head 150b extends transversely into wall 102. The second protrusion (not shown) of lifter head 150b extends transversely into wall 106.

Referring now to FIG. 14, when the plastic has hardened sufficiently, an appropriate driving apparatus moves lifter plate 154 and ejector plate 162 (FIG. 10) outwardly by equal rates and distances. The movement of the plates causes the lifter rods 152a, 152b and ejector pins 160 to extend outwardly from the mold. The lifter heads 150a, 150b and ejector pins 160 push the muffler half 200 outwardly off the mold projections. The movement is stopped when the walls 202, 204 and 206 are clear of the mold projections.

When the lifter plate 154 reaches the limit of its outward movement, the muffler half walls are clear of the mold projections. Then, the ejector plate continues to move outwardly. As shown in FIG. 15, the ejector pins extend to push the muffler half outward off the lifter heads 150a, 150b.

The movement of the muffler half 200 off the lifter heads is facilitated by the inward ramping surfaces 172, 184 and 182 (FIG. 12). The inward ramping surfaces of the lifter heads form correspondingly beveled faces 210, 212, 214 in the walls 204, 206, and 202, respectively, of the muffler half. The beveled faces form a portion of the perimeter of the wall openings 122.

Still referring to FIG. 15, as the ejector pins 160 move the muffler half outwardly off the lifter heads 150a, 150b, the sliding contact between the inward ramping surfaces 172, 184 of the lifter heads causes the muffler half to shift transversely as indicated by arrow 216. Additionally, the muffler half is preferably removed from the mold at a time when the plastic has cooled to a point at which the outer surface of the plastic has formed a hardened, resilient skin, yet the core of the plastic is still soft. At this point of cooling, the skin of the plastic is able to deflect to allow the muffler half to pass the protrusions of the lifting head. The plastic also possesses a shape memory which causes the muffler half to return to its intended shape after it has passed the lifting head protrusions. For example, for a polypropylene muffler, a suitable core temperature would be approximately 275–300 degrees F., with a skin thickness of 0.015– 0.020 inch.

In addition to the transverse movement represented by arrow 216, the muffler half may also move in a transverse direction angularly offset to direction 216 to allow the second protrusion 166 (FIG. 12) of lifting head 150b to disengage from wall 206. To illustrate this feature, FIG. 16 shows a fragment of a mold according to the invention having one single protrusion lifter head 150a and several double protrusion lifter heads 150b. The release surfaces 174, 188, and 190 of all the lifter heads are oriented in a common transverse, oblique direction, indicated by arrow 220. As the muffler half 200 is pushed outwardly off the lifter heads by the ejector pins, the sliding contact between inward ramping surfaces 172, 182, and 184 (FIGS. 11 and 12) of the lifter heads with the beveled surfaces 210, 212, and 214 (FIG. 15) of the wall openings causes the muffler half to shift in direction 220. The release surfaces 174, 188, and 190 allow this shift to occur.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A muffler comprising:

an assembly of two polymeric muffler halves, said muffler halves each including an outer wall defining an interior and an exterior of said muffler, and a plurality of integral baffle walls disposed within said interior of said muffler, wherein said interior of said muffler is divided into a plurality of chambers, said outer walls and said baffle walls each including mating edges, said muffler halves being joined along said mating edges of said outer walls and said baffle walls;

one input pipe and one output pipe each disposed on and extending through said outer wall of said muffler, wherein said interior of said muffler is in communication with said exterior of said muffler; and a plurality of gas flow openings disposed within said baffle walls, wherein said plurality of chambers are in communication with each other and said input and output pipes, said gas flow openings disposed such that they do not intersect said mating edges of said muffler halves.

2. A muffler as in claim 1 wherein at least one of said muffler halves defines a filter chamber and includes means for detachably receiving a filter within said chamber.

3. A muffler as defined in claim 2 further comprising a filter comprising:

a shell defining an internal chamber, said shell having first and second openings;

an insert housed within said internal chamber dividing said internal chamber into a plurality of compartments; and a filter media contained within said plurality of compartments;

whereby gas enters said internal chamber through said first opening, passes through said filter media and exits said internal chamber through said second opening.

4. A muffler of the type used with internal combustion engines, said muffler comprising:

first and second muffler halves, each a one-piece construction of polymeric material, each including a cup-shaped outer wall and a plurality of baffles therein, said baffles defining a plurality of chambers, the outer wall and baffles of each half being aligned and mating with the outer wall and baffles, respectively, of the other half;

said baffles of at least one of said muffler halves defining passageways to permit gas flow between said chambers, each of said passageways being defined entirely by one of said baffle walls in one of said halves; and bonding means for bonding said mating outer walls and baffles of said two halves together.

5. A muffler as in claim 4, wherein at least one of said muffler halves defines a filter chamber and includes means for detachably receiving a filter.

6. A muffler as defined in claim 5 further comprising a filter comprising:

a shell defining an internal chamber, said shell having first and second openings;

an insert housed within said internal chamber dividing said internal chamber into a plurality of compartments; and a filter media contained within said plurality of compartments;

whereby gas enters said internal chamber through said first opening, passes through said filter media and exits said internal chamber through said second opening.

7. A muffler comprising:

an assembly of two polymeric muffler halves, said muffler halves each comprised of an outer wall including a mating edge, a plurality of integral baffle walls including mating edges, and a plurality of gas flow openings; said muffler halves being joined along said mating edges of said outer walls and said baffle walls; said baffle walls being comprised of longitudinal walls which extend longitudinally along said muffler halves and lateral walls which extend laterally along said muffler halves, whereby said longitudinal and said lateral walls intersect to define a plurality of chambers; said gas flow openings defined within said baffle walls wherein said plurality of chambers are in communication with each other; said gas flow openings further disposed such that they do not intersect said mating edges of said muffler halves;

an input pipe extending through said outer wall of said muffler being in communication with said plurality of chambers;

an output pipe extending through said outer wall of said muffler being in communication with said plurality of chambers;

said input pipe, said gas flow openings, and said output pipe cooperating to define a gas flow pathway into said muffler, through said plurality of chambers and out of said muffler.

8. A muffler as in claim 7, wherein at least one of said muffler halves defines a filter chamber and includes means for detachably receiving a filter.

9. A muffler comprising:

two adjoined one-piece polymeric muffler halves each comprising an outer wall defining an interior and exterior of said muffler, said outer wall including an input means for allowing exhaust gas to flow from said exterior of said muffler to said interior of said muffler and an output means for allowing exhaust gas to flow from said interior of said muffler to said exterior of said muffler, a plurality of baffles walls defining a plurality of chambers within said muffler, and a plurality of gas flow openings in said plurality of baffle walls providing communication between said plurality of chambers, wherein said outer wall, said baffle walls and said openings cooperate to define a gas flow passageway between said input means and said output means;

at least one of said muffler halves further including attachment means for detachably receiving a filter canister, said attachment means disposed along said gas flow passageway between said input means and said output means;

a filter canister detachably mounted on said attachment means; and a filter media within said filter canister;

said gas flow openings being arranged to force all gas flowing through said muffler to pass through said filter canister.

10. A muffler as defined in claim 9 further comprising a divider insert within said filter canister dividing said filter canister into a plurality of compartments, said filter media being located within each of said plurality of compartments.

11. A muffler as defined in claim 10 further comprising an annular seal seated within said filter chamber for forming a gas-tight seal about said filter canister.

12. A muffler as defined in claim 11 wherein said filter media includes an absorbent of NOCHAR H620.

13. A muffler comprising:

a muffler body having an input pipe for allowing exhaust gas to enter said muffler body and an output pipe to allow exhaust gas to exit from said muffler body;

attachment means for detachably connecting a filter canister to said muffler body;

a filter canister detachably connected to said attachment means, said canister defining a first gas port means for allowing gas to pass from said muffler body into said canister and a second gas port means for allowing gas to pass from said canister into said muffler body;

a filter media within said filter canister;

baffle means within said muffler body for causing all gas entering said muffler body through said input pipe to pass through said filter canister and exit said muffler body through said output pipe.

14. A muffler as defined in claim 13 further comprising a divider insert within said filter canister dividing said filter canister into a plurality of compartments, said filter media within said plurality of compartments.

15. A muffler as defined in claim 14 wherein said filter media includes an absorbent of NOCHAR H620.

* * * * *